United States Patent
Yanagi et al.

[19]

[11] Patent Number: 5,902,999
[45] Date of Patent: May 11, 1999

[54] ACCELERATION SENSOR

[75] Inventors: Eiji Yanagi, Kanagawa; Ryoichi Yoshida, Shiga; Hiroaki Fujii, Shiga; Yuichi Sawawatari, Shiga, all of Japan

[73] Assignee: Takata Corporation, Tokyo, Japan

[21] Appl. No.: 08/907,057

[22] Filed: Aug. 6, 1997

[30] Foreign Application Priority Data

Aug. 6, 1996 [JP] Japan .................................. 8-207081

[51] Int. Cl.$^6$ .................................................. G01D 5/34
[52] U.S. Cl. ...................................... 250/231.1; 73/514.19
[58] Field of Search ...................... 250/231.1; 73/514.19, 73/514.21, 514.26

[56] References Cited

U.S. PATENT DOCUMENTS 3,927,286 12/1975 Fohl .
4,822,999 4/1989 Parr ........................................ 250/227
4,900,925 2/1990 Andres et al. .
5,373,153 12/1994 Cumberledge et al. ............. 250/231.1

FOREIGN PATENT DOCUMENTS 1 531 973 5/1975 United Kingdom .

*Primary Examiner*—Edward P. Westin
*Assistant Examiner*—Thanh X. Luu
*Attorney, Agent, or Firm*—Foley & Lardner

[57] ABSTRACT

The present invention encompasses an acceleration sensor which is capable of detecting the magnitude or the azimuth of acceleration. For this purpose, a ball 2 is set onto a bottom 1b of a tapered housing. A light emitter 3 is disposed thereunder and a light receiving unit 4 is disposed thereabove. The light receiving unit 4 comprises four light receiving elements 5A–5D which are disposed about the optical axis 10. When acceleration force is exerted on the ball 2 and the ball 2 is moved, light spot 20 of the ball 2 is moved also and output signals produced by receiving elements 5A through 5D are changed, thereby acceleration can be detected.

2 Claims, 3 Drawing Sheets

| 端子 | ロジック / ケースNo. | 1 | 2 | 3 | 4 | 5 | 6 | 7 | 8 | 9 |
|---|---|---|---|---|---|---|---|---|---|---|
| 9C | (A×C)×(B×D) | 0 | 0 | 0 | 0 | 1 | 0 | 0 | 0 | 0 |
| 9X | (A×D)+(B×C) | 0 | 0 | 0 | 1 | 1 | 1 | 0 | 0 | 0 |
| 9Y | (A×B)+(C×D) | 0 | 1 | 0 | 0 | 1 | 0 | 0 | 1 | 0 |

ACCELERATION SENSOR

BACKGROUND OF THE INVENTION

The present invention relates to an acceleration sensor for detecting the acceleration in the horizontal direction which is suitable for movable object, such as a vehicle, and more particularly to an acceleration sensor for detecting the acceleration in the horizontal direction by detecting the movement of a ball in the lateral direction.

A retractor of a seat belt device for a vehicle is provided with an acceleration sensor for detecting the acceleration given on the vehicle. One of such acceleration sensor comprises a ball, a ball seat on which the ball is placed and which permits the ball to move in the lateral direction when the external force is applied to the ball in the lateral direction, and a detecting means for detecting the movement of the ball from the ball seat.

U.S. Pat. No. 3,927,286 discloses an acceleration sensor in which a concentric conductive detection ring is disposed around a concentric conductive ball seat ring. The conductive ball moves from the ball seat ring due to the external force applied in the horizontal direction and comes in contact with the detection ring so that the rings are conducted through the ball, thereby outputting an acceleration detection signal.

British Patent No. 1,531,973 discloses an acceleration sensor in which a ball is placed on a ball seat whereby a micro switch is pushed. As the ball is moved, the pushing force exerted on the micro switch is released so that a signal is outputted from the micro switch.

Japanese Unexamined Patent Publication No. 64-54362 (the convention priority was claimed based on West German Patent Application No. 3725758.7) discloses an acceleration sensor comprising a light emitter disposed on either one of upper or lower sides of an inertia member having a spherical bottom and a light receiver disposed on the other side of the inertia member which is provided with a through hole in the optical axial direction for communication between the light emitter and the light receiver. As the inertia member tilts due to an acceleration in the lateral direction, the through hole deviates from the optical axis so that the optical communication between the light emitter and the light receiver is blocked, thereby outputting a signal.

SUMMARY OF THE INVENTION

There are problems with the aforementioned acceleration sensors that either one of the sensors can only detect whether the acceleration is more than a predetermined value (threshold) or not but can not detect the magnitude of the acceleration and also not detect the azimuth of the acceleration.

It is an object of the present invention to provide an acceleration sensor which is capable of detecting the magnitude of acceleration. It is another object of the present invention to provide an acceleration sensor which is capable of detecting the azimuth in the horizontal plane of acceleration.

An acceleration sensor of the present invention has a ball, a ball seat on which the ball is placed and which allows the movement of the ball in the lateral direction when an external force is exerted on the ball in the lateral direction, and a detector which can detect the movement of the ball from the ball seat. The ball can be made of translucent material, and the detector may comprise a light emitter disposed on either one of upper and lower sides of the ball and a light receiving unit disposed on the other side. In the aforementioned acceleration sensor, the light from the light emitter is transmitted through the ball and received by the light receiving elements.

When no external force is exerted on the ball in the lateral direction, the light from the light emitter reaches the light receiving unit through the center of the ball so that the light receiving unit receives large quantities of light. As external force is exerted on the ball, the ball moves in the lateral direction. Then, when the light receiving unit is one of which output is increased in proportion to the quantity of received light, the quantity of received light transmitted from the light emitter to the light receiving unit through the ball is decreased and the output of the light receiving unit is also decreased. As the decrease in the output of the light receiving unit is proportional to the increase in the movement of the ball, it is possible to detect the magnitude of the acceleration based on the variation in the output of the light receiving unit.

According to an aspect of the present invention, the light receiving unit includes at least three light receiving elements which are disposed surrounding a vertical line passing through the center of said ball seat. In the aforementioned acceleration sensor, as the ball moves, the quantity of light received by one or two light receiving elements positioned in the direction in which the ball moves becomes greater than that received by the other light receiving elements so that the outputs of the light receiving elements are greater than the outputs of the other light receiving elements. In this way, it is possible to detect the direction of the acceleration from the differences among the light receiving elements.

PREFERRED EMBODIMENTS OF THE INVENTION

Hereinafter, embodiments of the invention will be described with reference to the drawings.

Figure 1:
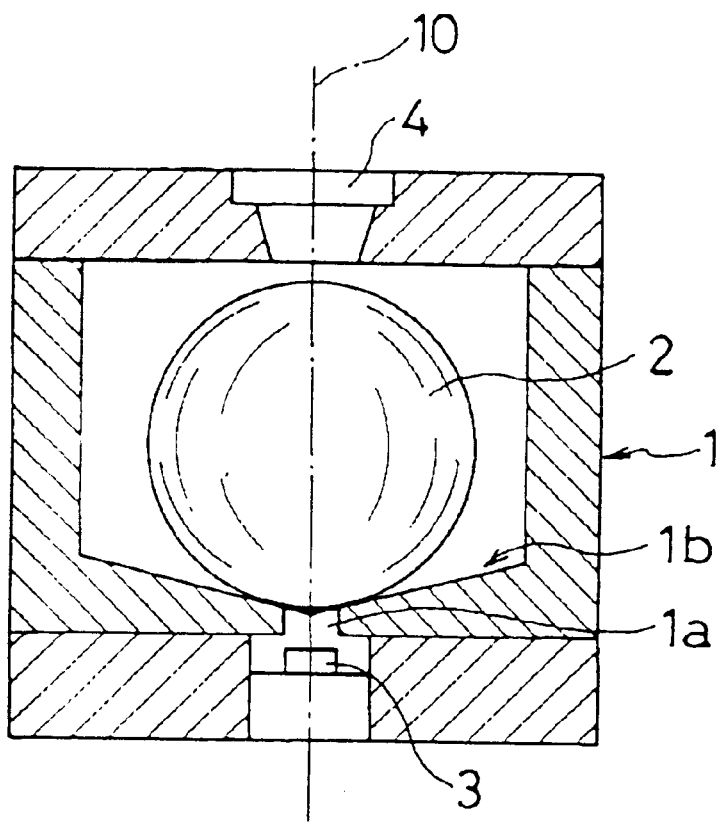
FIG. 1 is a vertical sectional view of an acceleration sensor according to an embodiment.
Figure 2:
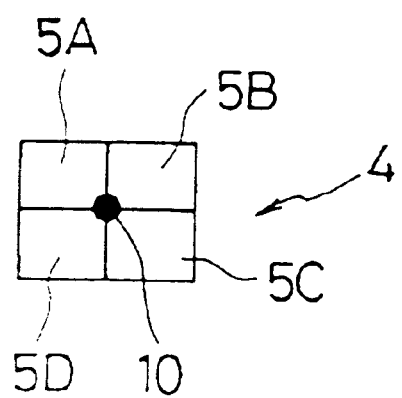
FIG. 2 is a view showing the structure of a light receiving unit of the acceleration sensor according to the embodiment.

FIG. 1 is a vertical sectional view of an acceleration sensor according to an embodiment of the present invention, FIG. 2 is a bottom view of a light receiving unit, and FIG. 3 is a block diagram of a decision circuit.

The acceleration sensor comprises a housing 1 of which bottom 1b is formed in a taper in such a manner as to have descending slope toward the center. The bottom 1b is provided with an opening 1a at the center thereof. The acceleration sensor also comprises a light emitter 3 disposed below the opening 1a.

Disposed inside the housing 1 is a ball 2 made of translucent material. When no external force is exerted on the ball 2, the ball 2 sits on the upper periphery of the opening 1a. In this embodiment, the upper periphery of the opening 1a is therefore the ball seat. The optical axis 10 of the light emitter 3 is a vertical line passing through the center of the ball 2 sitting on the ball seat.

Figure 4A:
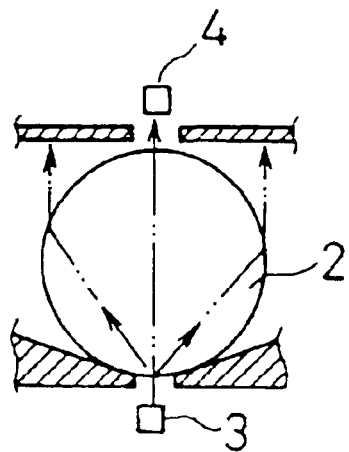
FIGS. 4(a) and 4(b) are explanatory views for the operation of the acceleration sensor according to an embodiment of the present invention.
Figure 4B:
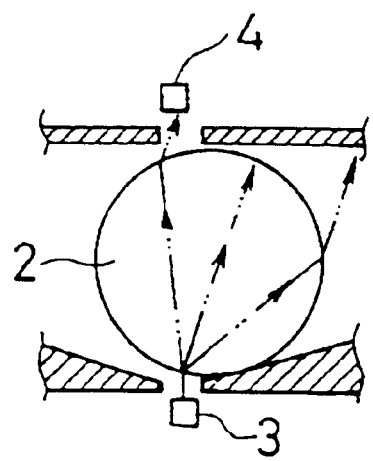

As shown in FIGS. 4(a) and 4(b), a light receiving unit 4 is disposed plumb above the light emitter 3. The light receiving unit 4 comprises four light receiving elements 5A–5D as shown in FIG. 2. These light receiving elements 5A–5D are disposed about the optical axis 10 of the light emitter 3 to have an angle of 90° between each adjacent two of them circumferentially.

Figures 3A, 3B:
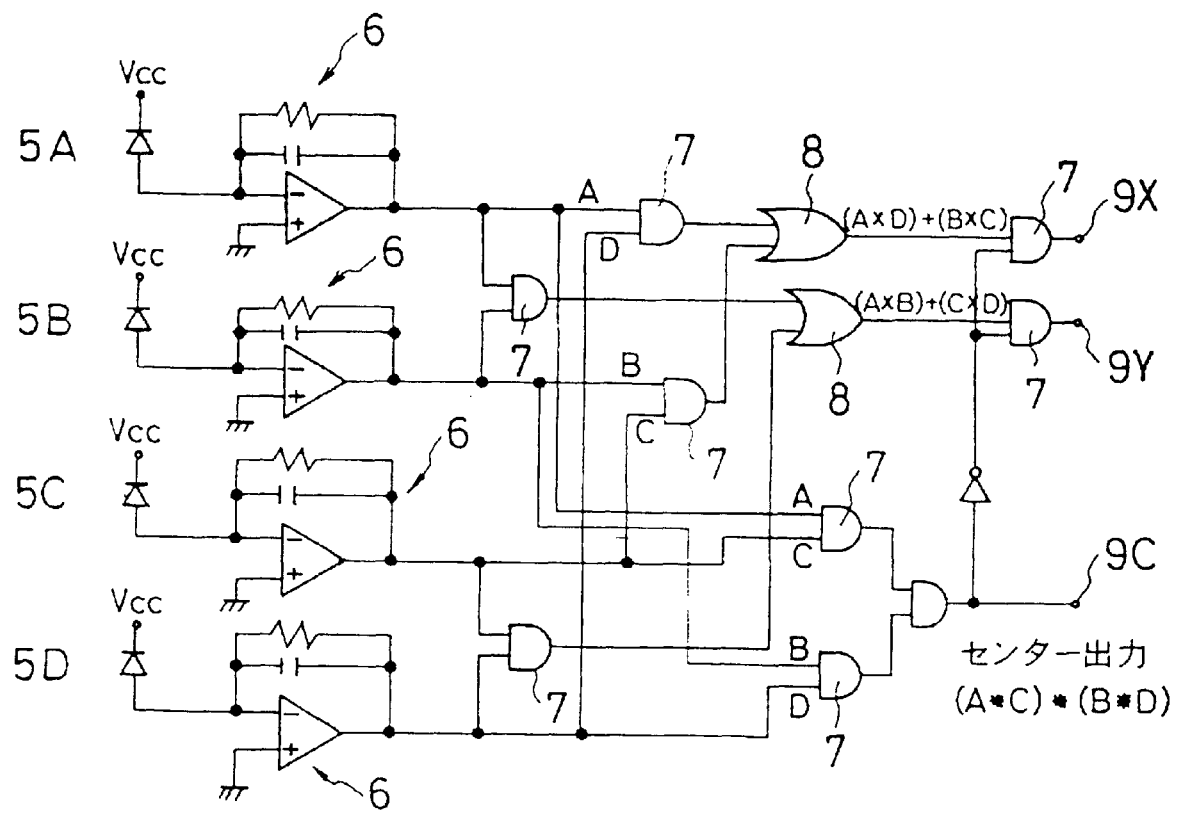
FIGS. 3(a) and 3(b) are a truth table and a diagram showing a logical circuit of the acceleration sensor according to an embodiment of the present invention.

In this embodiment, the light receiving unit 4 is a tetrameric PIN photodiode and the respective light receiving elements 5A–5D are composed of photodiodes which are turned on when the quantity of received light is over a predetermined value and transmit the voltage of a power supply Vcc to inverting input terminals of comparators 6, according to the circuitry shown in FIG. 3(b). The outputs of the comparators 6 are collected to three output terminals 9X, 9Y, 9C via a logical control unit composed of a plurality of AND circuits 7 and OR circuits 8 as shown in FIG. 3(b). FIG. 3(a) is a truth table of the logical control unit.

The ball 2 in FIG. 1 is, for example, a glass ball made of glass cord (TaF-3) of which refractive index is 1.804, Abbe number is 46, count is 4.76, and coefficient of thermal expansion is $73 \times 10^{-7}/°C$.

Figure 5:
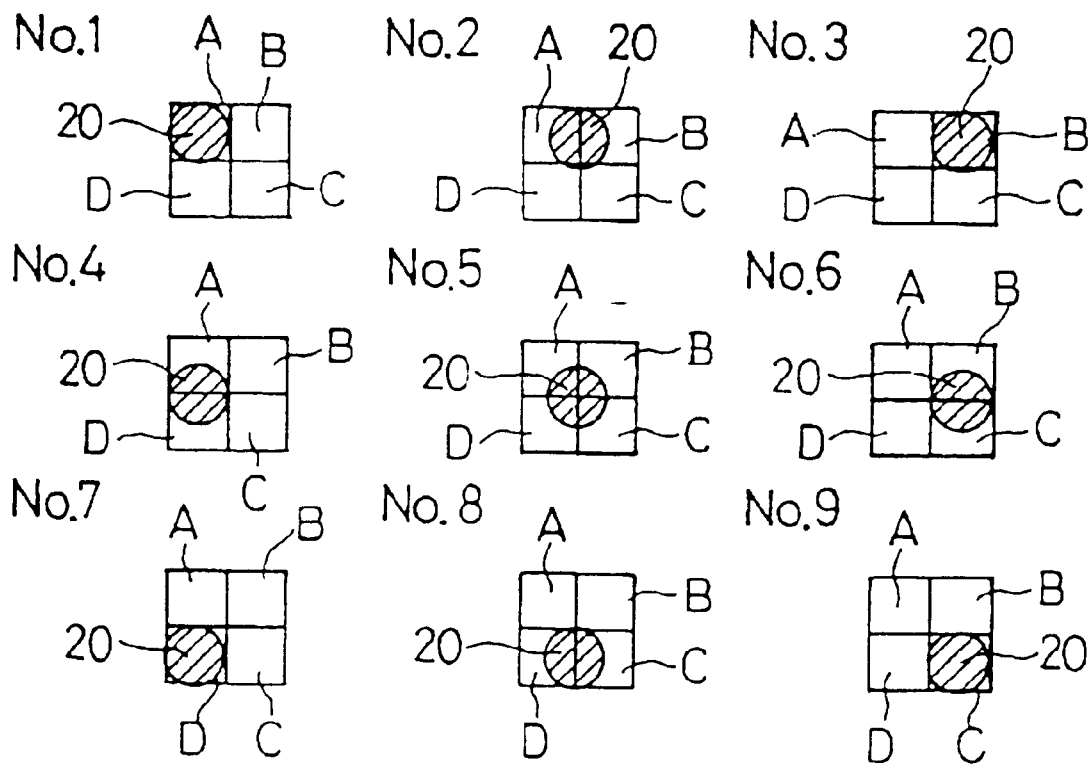
FIG. 5 is an explanatory view for the operation of the respective light receiving elements of the acceleration sensor according to an embodiment of the present invention.

FIGS. 4(a) and 4(b) are explanatory views for the light path of the acceleration sensor and FIG. 5 is an explanatory view for the states of light irradiation to the respective light receiving elements in the cases No. 1 through No. 9.

As shown in FIG. 4(a), in a state where the ball 2 sits on and uniformly across the upper periphery of the opening 1a, a light spot 20 lights up the respective light receiving elements 5A–5D uniformly so that all of the light receiving elements 5A–5D are turned on. This corresponds to case No. 5 of FIG. 5. As shown in FIG. 4(b), in a state where a lateral force is exerted on the ball 2 and then the ball is moved, the transmitted light of the ball 2 offsets from the optical axis 10. This corresponds to one of the cases Nos. 1–4 and 6–9 of FIG. 5.

In the case No. 1 of FIG. 5, as the ball 2 is moved to the upper left side in FIG. 5, the light spot 20 lights up only the light receiving element 5A so that the light receiving element 5A is turned on alone. In the case No. 2, as the ball 2 is moved to the upper side in FIG. 5, only the light receiving elements 5A and 5B are turned on. Similarly, the light receiving element 5B is turned on alone in the case No. 3, only the light receiving elements 5A and 5D are turned on in the case No. 4, only the light receiving elements 5B and 5C are turned on in the case No. 6, the light receiving element 5D is turned on alone in the case No. 7, only the light receiving elements 5C and 5D are turned on in the case No. 8, and the light receiving element 5C is turned on alone in the case No. 9.

In FIG. 3(a), the output of the light receiving element 5A is designated by A, the output of the light receiving element 5B is designated by B. the output of the light receiving element 5C is designated by C, and the output of the light receiving element SD is designated by D.

The logic for the output terminal 9C is (A×C)×(B×D), the logic for the output terminal 9X is (A×D)+(B×C), and the logic for the output terminal 9Y is (A×B)+(C×D), wherein × designates a logical product (AND) and + designates a logical sum (OR).

As shown in FIG. 3(a), only in the case No. 5 where A, B, C, and D are all "1", the terminals 9C, 9X, 9Y all indicate "1". That is, when the terminals 9C, 9X, 9Y all indicate "1", the ball 2 sits on and uniformly across the upper periphery of the opening 1a and no lateral force is exerted on the ball 2.

In the case No. 4 or No. 6 where only the terminal 9X indicates "1", it is found that a right or left force is exerted on the ball 2, thereby detecting, for example, that the acceleration in the longitudinal direction of the vehicle exceeds the predetermined value.

In the case No. 2 or No. 8 where only the terminal 9Y indicates "1", it is found that a vertical force is exerted on the ball 2, thereby detecting, for example, that the acceleration in the cross direction exceeds the predetermined value.

Though, in the above embodiment shown in FIGS. 1 through 5, an acceleration exceeding the predetermined value and the direction of the acceleration are detected depending on ON, OFF of the light receiving elements 5A through 5D, the present invention is not limited thereto and the magnitude of the acceleration may be detected by using a receiving element, of which output changes corresponding to the quantity of received light, such as a phototransistor instead of the light receiving unit 4.

For example, when a phototransistor is employed instead of the light receiving unit 4 in FIG. 4, as the greater the movement of the ball 2 in the right direction the smaller the quantity of received light of the phototransistor, it can be detected that the ball 2 is offset to the right side depending on the size of the output of the phototransistor, thereby detecting the magnitude of the acceleration exerted on the ball 2.

Though the four light receiving elements are used in the above embodiment, three or more receiving elements may be enough for detecting the direction of the acceleration.

Though the light receiving elements are disposed above the ball in the above embodiment, the light receiving elements may be disposed below the ball and, in this case, the light emitter is disposed above the ball.

As apparent from the above description, the present invention provides an acceleration sensor capable of detecting the magnitude of the acceleration or the direction of the acceleration.

What is claimed is:

1. An acceleration sensor having a ball, a ball seat on which the ball is placed and which allows the movement of the ball in the lateral direction when an external force is exerted on the ball in the lateral direction, and a detecting means for detecting the movement of the ball in the lateral direction, and a detecting means for detecting the movement of the ball from the ball seat, wherein the ball is made of translucent material, the detecting means comprising a light emitter disposed on either one of upper and lower sides of the ball and a light receiving unit disposed on the other side, wherein the light receiving unit receives light even when no external force acts on the ball.

2. An acceleration sensor as claimed in claim 1, wherein said light receiving unit includes at least three light receiving elements which are disposed surrounding a vertical line passing through the center of said ball seat.

* * * * *